United States Patent
Douglass

(10) Patent No.: US 11,192,661 B2
(45) Date of Patent: Dec. 7, 2021

(54) AIRCRAFT TOW POINT

(71) Applicant: The Boeing Company, Chicago, IL (US)

(72) Inventor: Daniel B. Douglass, Everett, WA (US)

(73) Assignee: The Boeing Company, Chicago, IL (US)

( * ) Notice: Subject to any disclaimer, the term of this patent is extended or adjusted under 35 U.S.C. 154(b) by 302 days.

(21) Appl. No.: 16/517,092

(22) Filed: Jul. 19, 2019

(65) Prior Publication Data

US 2021/0016898 A1  Jan. 21, 2021

(51) Int. Cl.
| | | |
|---|---|---|
| *B64F 1/22* | (2006.01) | |
| *B64C 25/40* | (2006.01) | |
| *B64C 25/42* | (2006.01) | |
| *B64F 1/00* | (2006.01) | |
| *B64C 25/50* | (2006.01) | |
| *B60P 3/11* | (2006.01) | |

(52) U.S. Cl.
CPC ............ *B64F 1/227* (2013.01); *B64C 25/405* (2013.01); *B64C 25/42* (2013.01); *B60P 3/11* (2013.01); *B64C 25/50* (2013.01); *B64F 1/002* (2013.01)

(58) Field of Classification Search
CPC ........ B64F 1/227; B64F 1/002; B64C 25/405; B64C 25/42; B64C 25/50; B64C 1/061; B64C 25/32; B60P 3/11
See application file for complete search history.

(56) References Cited

U.S. PATENT DOCUMENTS

| | | | | |
|---|---|---|---|---|
| 2,751,990 | A * | 6/1956 | Pearson | B64F 1/22 180/6.2 |
| 4,007,890 | A * | 2/1977 | Bremer | B64F 1/22 244/50 |
| 5,104,279 | A * | 4/1992 | Melnick | B64F 1/22 180/904 |
| 5,201,603 | A * | 4/1993 | Bassett | E01C 19/48 404/110 |
| 5,558,350 | A * | 9/1996 | Kimbrough | B60D 1/06 280/426 |
| 5,855,179 | A * | 1/1999 | Wood | B63B 21/16 114/254 |
| 7,445,178 | B2 * | 11/2008 | McCoskey | B64F 1/002 244/50 |
| 8,747,022 | B1 * | 6/2014 | Case | E01C 19/48 404/118 |
| 8,774,983 | B2 * | 7/2014 | Perry | B64F 1/22 701/2 |
| 10,155,574 | B1 * | 12/2018 | Tsarev | B63B 21/663 |
| 2001/0056544 | A1 * | 12/2001 | Walker | B60T 7/18 726/2 |

(Continued)

FOREIGN PATENT DOCUMENTS

| | | | | |
|---|---|---|---|---|
| JP | 5591251 B2 * | 9/2014 | | B64F 1/22 |
| JP | 2014221640 A * | 11/2014 | | B64F 1/10 |

(Continued)

*Primary Examiner* — Behrang Badii
*Assistant Examiner* — Jalal C Coduroglu
(74) *Attorney, Agent, or Firm* — Yee & Associates, P.C.

(57) ABSTRACT

An aircraft is presented. The aircraft comprises a tow point positioned on a body of the aircraft and forward of main landing gear of the aircraft, wherein the tow point is connected to an airframe of the aircraft to accept and distribute forces forward, aft, and normal to the aircraft.

20 Claims, 9 Drawing Sheets

(56) References Cited

U.S. PATENT DOCUMENTS

| | | | | |
|---|---|---|---|---|
| 2008/0314017 | A1* | 12/2008 | Johnson | B65H 49/18 |
| | | | | 57/269 |
| 2009/0123260 | A1* | 5/2009 | Howard-Leicester | |
| | | | | B60P 3/122 |
| | | | | 414/475 |
| 2009/0194968 | A1* | 8/2009 | Ardagna | B62D 63/067 |
| | | | | 280/460.1 |
| 2009/0236823 | A1* | 9/2009 | Prem | B62D 13/025 |
| | | | | 280/426 |
| 2010/0181786 | A1* | 7/2010 | Tejler | B60D 1/07 |
| | | | | 293/130 |
| 2012/0067269 | A1* | 3/2012 | Williams | B63B 17/02 |
| | | | | 114/361 |
| 2012/0137954 | A1* | 6/2012 | Williams | B63B 17/02 |
| | | | | 114/361 |
| 2012/0242061 | A1* | 9/2012 | Wulff | B60D 1/04 |
| | | | | 280/477 |
| 2017/0368897 | A1* | 12/2017 | Brickley | H04W 4/70 |
| 2018/0257773 | A1* | 9/2018 | Wypyszynski | B64C 31/028 |
| 2019/0021240 | A1* | 1/2019 | Kitchen | A01G 13/0287 |
| 2019/0338474 | A1* | 11/2019 | Case | E01C 19/48 |
| 2020/0233410 | A1* | 7/2020 | Burns | B60L 50/60 |
| 2021/0016898 | A1* | 1/2021 | Douglass | B64C 1/061 |

FOREIGN PATENT DOCUMENTS

| | | | | |
|---|---|---|---|---|
| JP | | 5952867 B2 * | 7/2016 | B64F 1/10 |
| WO | WO-2010061384 A2 * | | 6/2010 | B64F 1/10 |

* cited by examiner

AIRCRAFT TOW POINT

BACKGROUND INFORMATION

1. Field

The present disclosure relates generally to aircraft, and more specifically to towing an aircraft.

2. Background

To tow an aircraft, an aircraft tow vehicle connects to the front landing gear of the aircraft. Current aircraft tow vehicles include aircraft tow vehicles with tow bars and towbarless vehicles. Tow bars are connected to the front landing gear, while towbarless vehicles lift and carry the front landing gear. Towing an aircraft may also be referred to as "pushback." The aircraft tow vehicle may also be referred to as a "tractor" or a "tug."

An aircraft tow vehicle is heavy to provide traction. An aircraft tow vehicle can weigh up to over 100,000 pounds. Due to their size and weight, conventional aircraft tow vehicles may be undesirably difficult to maneuver.

Therefore, it would be desirable to have a method and apparatus that takes into account at least some of the issues discussed above, as well as other possible issues.

SUMMARY

An illustrative embodiment of the present disclosure provides an aircraft. The aircraft comprises a tow point positioned on a body of the aircraft and forward of main landing gear of the aircraft, wherein the tow point is connected to an airframe of the aircraft to accept and distribute forces forward, aft, and normal to the aircraft.

Another illustrative embodiment of the present disclosure provides a method of towing an aircraft. A connector of an aircraft tow vehicle is coupled to a tow point of the aircraft to form an interface, the tow point positioned on the skin of the aircraft and forward of main landing gear of the aircraft. An upward force is applied to the tow point of aircraft by the aircraft tow vehicle. The aircraft is towed at least one of forward or aft by driving the aircraft tow vehicle while the connector is coupled to the tow point.

Yet another illustrative embodiment of the present disclosure provides an aircraft tow vehicle. The aircraft tow vehicle has a connector configured to couple to a tow point of an aircraft, an active vertical loading system configured to apply a load through the connector to the tow point, and a movement system configured to drive the aircraft tow vehicle across the ground. The load provides traction to the movement system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that it would be desirable to have a more nimble and faster aircraft towing vehicle. The illustrative examples recognize and take into account that it would be desirable to have a smaller aircraft towing vehicle.

Figure 1:
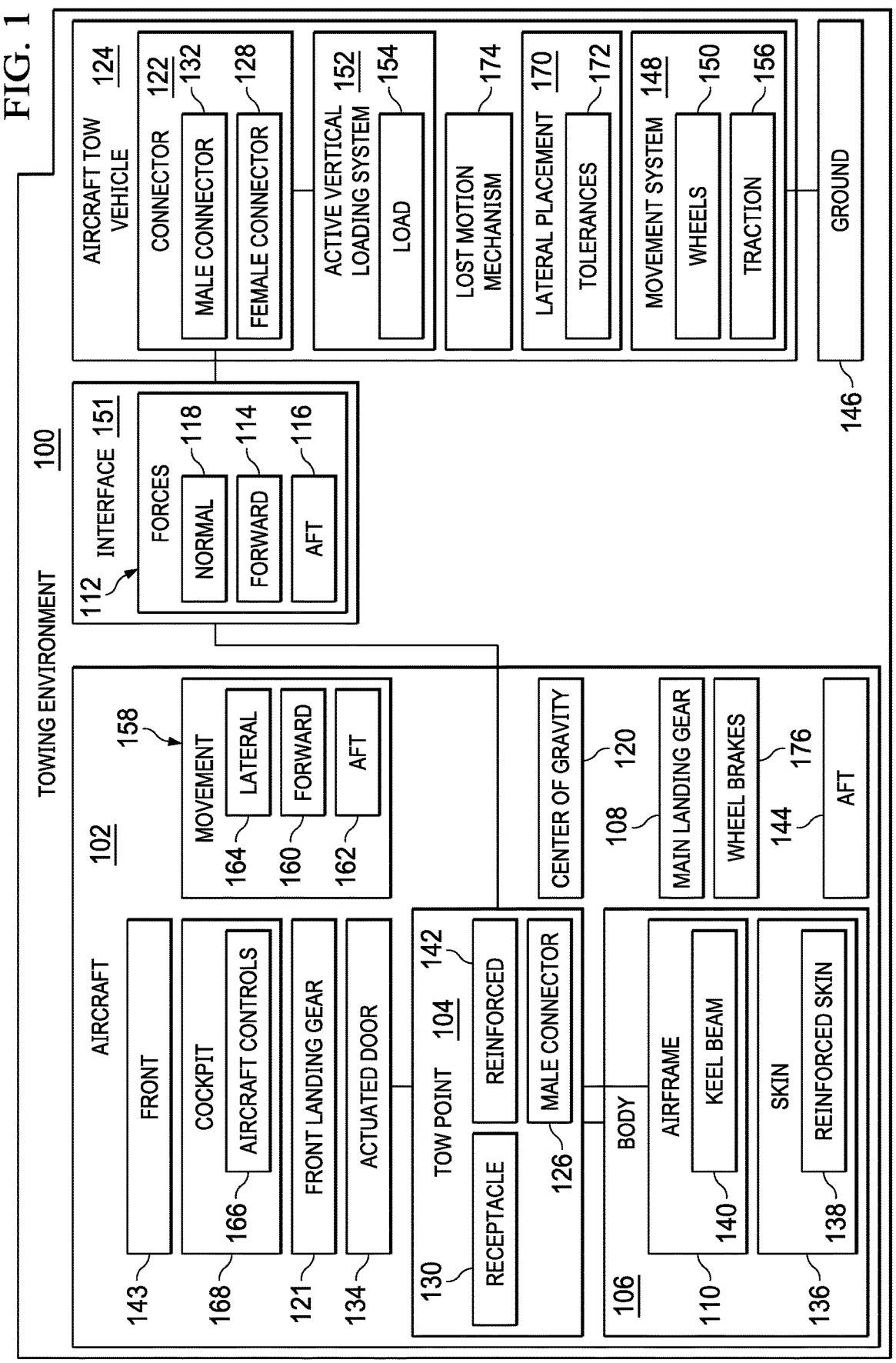
FIG. 1 is an illustration of a block diagram of a towing environment in accordance with an illustrative embodiment.

Turning now to FIG. 1, an illustration of a block diagram of a towing environment is depicted in accordance with an illustrative embodiment. Towing environment 100 includes aircraft 102 with tow point 104. Tow point 104 is positioned on body 106 of aircraft 102 and forward of main landing gear 108 of aircraft 102. Tow point 104 is connected to airframe 110 of aircraft 102 to accept and distribute forces 112 forward 114, aft 116, and normal 118 to aircraft 102. Tow point 104 is positioned at approximately center of gravity 120 of aircraft 102. Tow point 104 is positioned at or slightly in front of center of gravity 120.

Tow point 104 is desirably not behind center of gravity 120 of aircraft 102. When tow point 104 is behind center of gravity 120 of aircraft 102, application of an upward force normal 118 to aircraft 102 could apply an undesirable amount of force on front landing gear 121.

Moving tow point 104 farther forward of center of gravity 120 of aircraft 102 reduces steering effectiveness. Location of tow point 104 relative to center of gravity 120 of aircraft 102 is determined to achieve a desirable downward force for traction of aircraft tow vehicle 124 without compromising steering authority for aircraft 102.

Tow point 104 has any desirable design to connect to connector 122 of aircraft tow vehicle 124. Tow point 104 comprises at least one of a male component or a female component. In some illustrative examples, tow point 104 takes the form of male connector 126. When tow point 104 takes the form of male connector 126, connector 122 takes the form of female connector 128.

In some illustrative examples, tow point 104 takes the form of receptacle 130 configured to receive connector 122 of aircraft tow vehicle 124. In these illustrative examples, connector 122 takes the form of male connector 132.

In some illustrative examples, tow point 104 is exposed to environmental elements during operation of aircraft 102 including take-off, flight, landing, and taxiing. In some of these illustrative examples, tow point 104 is designed taking into consideration aerodynamics of aircraft 102. In some of these illustrative examples, tow point 104 is designed to introduce minimal drag to body 106 of aircraft 102.

In some illustrative examples, tow point 104 is covered during at least one of take-off, flight, or landing of aircraft 102. In some illustrative examples, actuated door 134 is connected to body 106 of aircraft 102. In these illustrative examples, actuated door 134 covers tow point 104 when tow point 104 is not in use. In these illustrative examples, actuated door 134 is opened to access tow point 104. When present, actuated door 134 may aid in aerodynamics of aircraft 102. When present, actuated door 134 may shield tow point 104 from environmental elements during operation of aircraft 102.

Body 106 of aircraft 102 has skin 136. In some illustrative examples, skin 136 around tow point 104 is reinforced to form reinforced skin 138 configured to provide support for forces 112 received through tow point 104. In some illustrative examples, reinforced skin 138 surrounds tow point 104 and reinforced skin 138 is configured to provide support for forces 114 received through tow point 104.

Tow point 104 is connected to airframe 110 in any desirable fashion to accept and distribute forces 112. In some illustrative examples, tow point 104 is connected to keel beam 140 of airframe 110. In some illustrative examples, additional components are added to airframe 110 specifically to accept and distribute forces 112. Tow point 104 is referred to as being reinforced 142 due to at least one of association with reinforced skin 138 or connections to airframe 110.

Adding tow point 104 and associated reinforcements may add weight to aircraft 102. In some illustrative examples of aircraft 102, the weight of tow point 104 added to aircraft 102 may be offset by removing weight from other components of aircraft 102.

In some illustrative examples, alternative towing capability is maintained on aircraft 102. For example, in some illustrative examples, at least one of nose gear towing capability or main gear towing capability by conventional tow vehicles is maintained on aircraft 102. In some illustrative examples, weight of tow point 104 and associated reinforcements is at least partially offset by removing a conventional towing assembly. In some illustrative examples, the weight of tow point 104 is at least partially offset by removing weight from the nose gear (not depicted) if nose gear towing will not be used.

In aircraft 102, moving from front 143 to aft 144, front landing gear 121 is encountered prior to main landing gear 108. Tow point 104 is positioned at or forward of main landing gear 108. In some illustrative examples, tow point 104 is positioned within main landing gear 108. In these illustrative examples, when main landing gear 108 is extended, tow point 104 is accessible. In these illustrative examples, when main landing gear 108 is retracted and stored, tow point 104 is not accessible.

To tow aircraft 102 across ground 146, aircraft tow vehicle 124 is positioned beneath aircraft 102. Aircraft tow vehicle 124 is moved across ground 146 using movement system 148. Movement system 148 takes any desirable form. In some illustrative examples, movement system 148 comprises wheels 150.

After positioning aircraft tow vehicle 124 beneath aircraft 102, connector 122 is coupled to tow point 104 of aircraft 102. Coupling connector 122 of aircraft tow vehicle 124 to tow point 104 of aircraft 102 forms interface 151. Active vertical loading system 152 applies load 154 to tow point 104 through connector 122. By applying load 154 to tow point 104 through connector 122, active vertical loading system 152 applies normal 118 forces 112 to aircraft 102.

Applying normal 118 forces 112 to aircraft 102 applies an equal downward force on aircraft tow vehicle 124. The downward force applied to aircraft tow vehicle 124 by aircraft 102 in response to normal 118 forces 112 increases traction 156 of movement system 148 of aircraft tow vehicle 124.

By applying load 154 by active vertical loading system 152, a sufficient value for traction 156 is present to tow aircraft 102. By applying load 154 by active vertical loading system 152, aircraft tow vehicle 124 is at least one of smaller or lighter than conventional aircraft tugs or tractors and configured to tow aircraft 102.

Movement 158 of aircraft 102 during towing is initiated by aircraft tow vehicle 124. Aircraft tow vehicle 124 provides forward 114 forces 112 to cause forward 160 movement 158 of aircraft 102. Aircraft tow vehicle 124 provides forward 114 forces 112 by driving forward across ground 146 using movement system 148.

Aircraft tow vehicle 124 provides aft 116 forces 112 to cause aft 162 movement 158 of aircraft 102. Aircraft tow vehicle 124 provides aft 116 forces 112 by driving in reverse across ground 146 using movement system 148.

In some illustrative examples, aircraft tow vehicle 124 does not control lateral 164 movement 158 of aircraft 102. In some illustrative examples, lateral steering of aircraft 102 is performed using aircraft controls 166 of aircraft 102 as aircraft 102 is towed by aircraft tow vehicle 124. Aircraft controls 166 are located in cockpit 168 of aircraft 102. Aircraft controls 166 are managed by human pilots.

In these illustrative examples, as aircraft 102 is towed, lateral placement 170 of aircraft tow vehicle 124 is maintained within tolerances 172. Tolerances 172 are configured so that lateral movement of aircraft tow vehicle 124 does not affect lateral 164 movement 158 of aircraft 102.

In some illustrative examples, aircraft tow vehicle 124 has lost motion mechanism 174. Lost motion in the lateral direction is supplied by at least one of interface 151 between aircraft 102 and aircraft tow vehicle 124 or lost motion mechanism 174 of aircraft tow vehicle 124. The lost motion in the lateral direction allows some movement of aircraft tow vehicle 124 in the lateral direction without applying lateral 164 movement 158 to aircraft 102.

In other illustrative examples, aircraft tow vehicle 124 controls lateral 164 movement 158 to aircraft 102. In these illustrative examples, lost motion mechanism 174 may not be present in aircraft tow vehicle 124. In some of these illustrative examples, lost motion mechanism 174 has a different setting to allow for smaller tolerances 172.

In some illustrative examples, aircraft tow vehicle 124 generates movement 158 of aircraft 102, but not braking of aircraft 102. In these illustrative examples, aircraft 102 is stopped using wheel brakes 176 of aircraft 102. Wheel brakes 176 are components of aircraft 102 and are used to brake the wheels (not depicted) of aircraft 102. In some of these illustrative examples, normal 118 forces 112 to aircraft 102 are reduced when application of wheel brakes 176 is detected. By reducing normal 118 forces 112 to aircraft 102, aircraft braking authority is increased.

In other illustrative examples, aircraft tow vehicle 124 applies braking to aircraft 102.

The illustration of towing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, lost motion mechanism 174 may not be present. In other illustrative examples, movement system 148 includes other components such as treads, track plates, belts, or any other desirable component.

As another example, active vertical loading system 152 may have a monitor. The monitor is used to make sure pavement loading limits are not exceeded.

Figure 2:
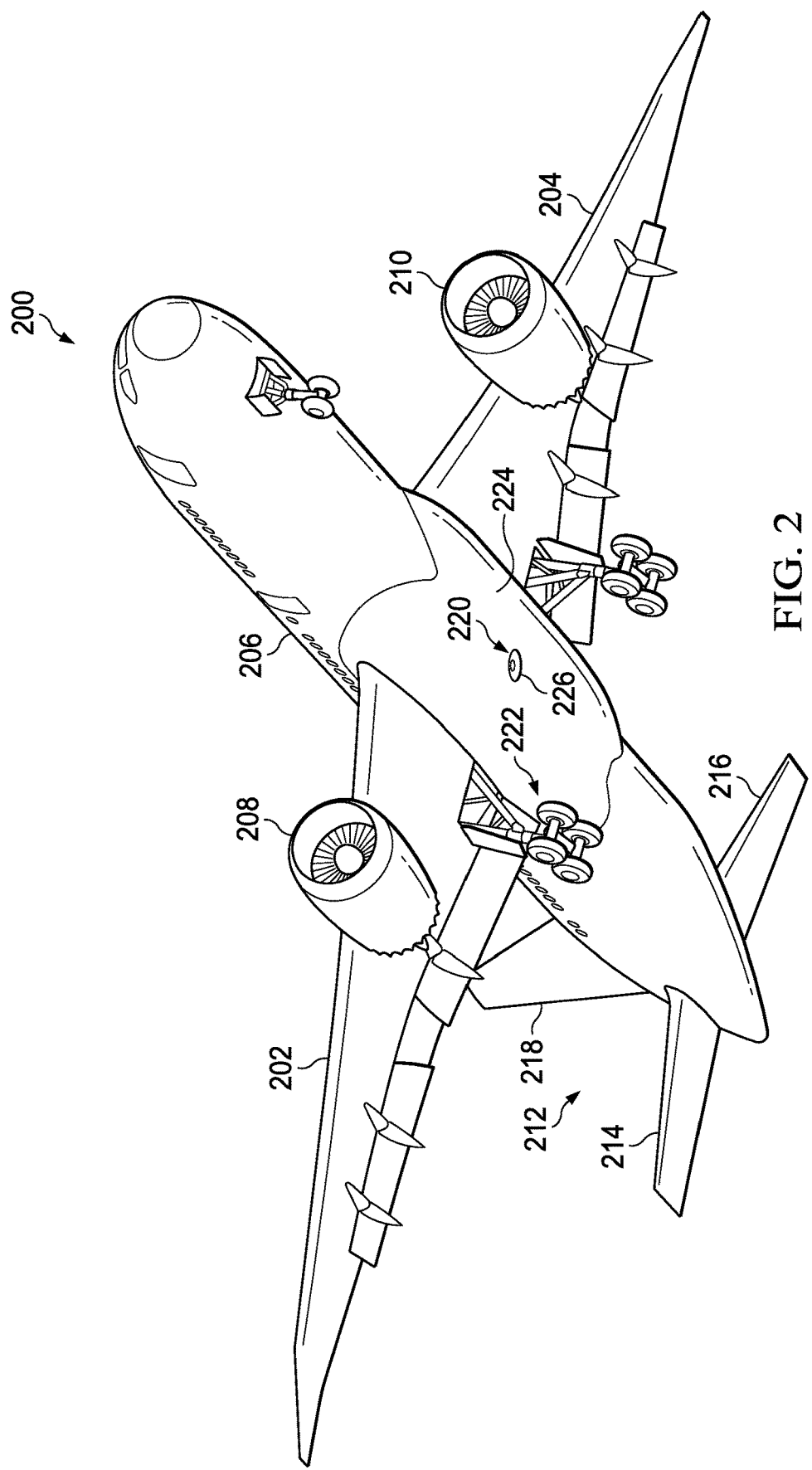
FIG. 2 is an illustration of an underside of an aircraft with a tow point in accordance with an illustrative embodiment.

Turning now to FIG. 2, an illustration of an underside of an aircraft with a tow point is depicted in accordance with an illustrative embodiment. Aircraft 200 is a physical implementation of aircraft 102 of FIG. 1.

In this illustrative example, aircraft 200 has wing 202 and wing 204 attached to body 206. Aircraft 200 includes engine 208 attached to wing 202 and engine 210 attached to wing 204.

Body 206 has tail section 212. Horizontal stabilizer 214, horizontal stabilizer 216, and vertical stabilizer 218 are attached to tail section 212 of body 206.

Aircraft 200 is an example of an aircraft in which a tow point may be implemented in accordance with an illustrative embodiment. As depicted, aircraft 200 has tow point 220. Tow point 220 is positioned on body 206 of aircraft and forward of main landing gear 222 of aircraft 200. Tow point 220 is connected to an airframe (not depicted) of aircraft 200 to accept and distribute forces forward, aft, and normal to aircraft 200. Tow point 220 is positioned at approximately a center of gravity of aircraft 200.

Body 206 of aircraft 200 has skin 224. In some illustrative examples, skin 224 around tow point 220 is reinforced to form a reinforced skin configured to provide support for forces received through tow point 220.

Tow point 220 takes any desirable form to connect to a connector of an aircraft tow vehicle. As depicted, tow point 220 is receptacle 226.

Figure 3:
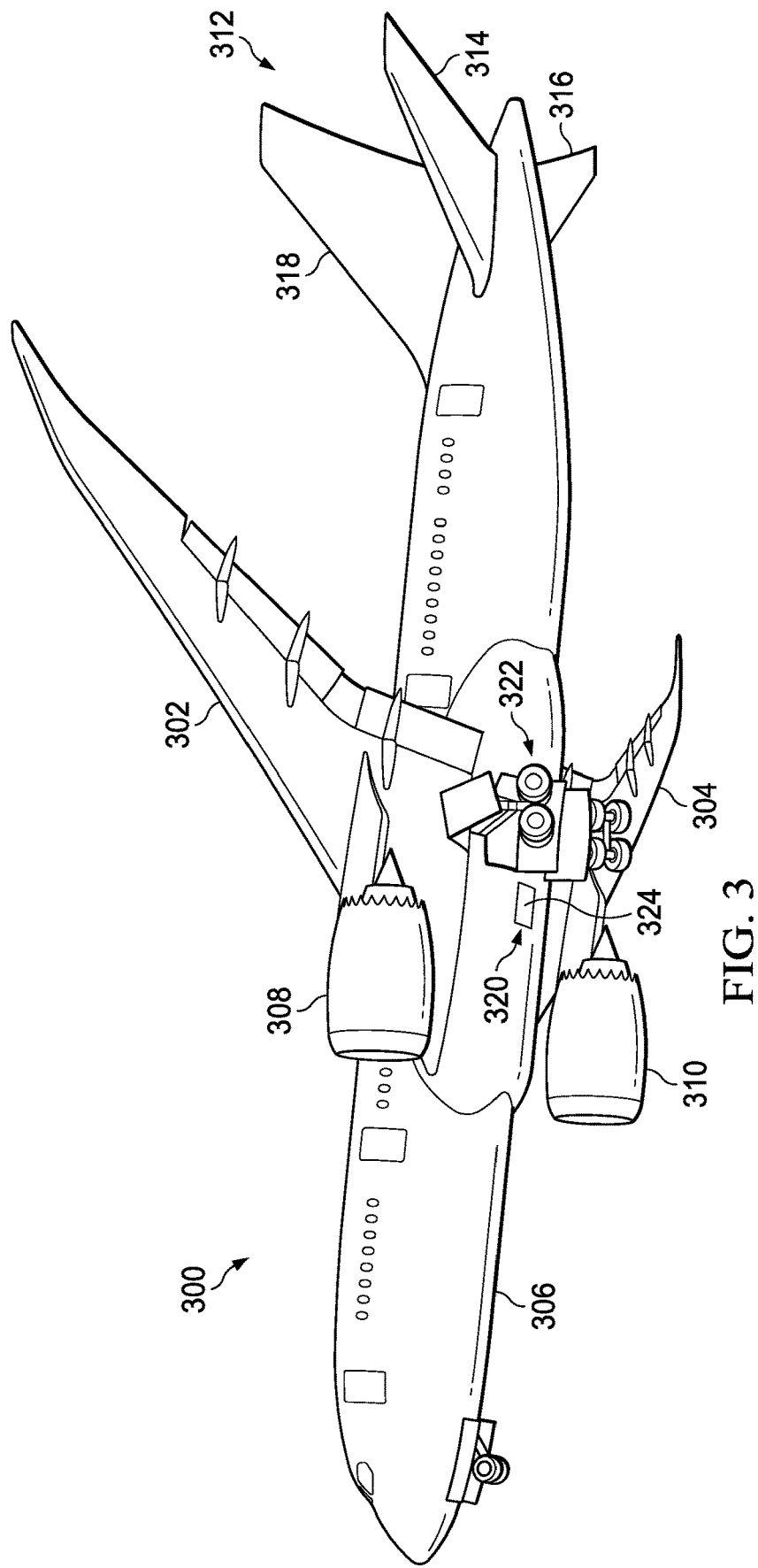
FIG. 3 is an illustration of an aircraft with a tow point in flight in accordance with an illustrative embodiment.

Turning now to FIG. 3, an illustration of an aircraft with a tow point in flight is depicted in accordance with an illustrative embodiment. Aircraft 300 is a physical implementation of aircraft 102 of FIG. 1.

In this illustrative example, aircraft 300 has wing 302 and wing 304 attached to body 306. Aircraft 300 includes engine 308 attached to wing 302 and engine 310 attached to wing 304.

Body 306 has tail section 312. Horizontal stabilizer 314, horizontal stabilizer 316, and vertical stabilizer 318 are attached to tail section 312 of body 306.

Aircraft 300 is an example of an aircraft in which a tow point may be implemented in accordance with an illustrative embodiment. As depicted, aircraft 300 has tow point 320. Tow point 320 is positioned on body 306 of aircraft and forward of main landing gear 322 of aircraft 300. Tow point 320 is connected to an airframe (not depicted) of aircraft 300 to accept and distribute forces forward, aft, and normal to aircraft 300. Tow point 320 is positioned at approximately a center of gravity of aircraft 300.

Tow point 320 takes any desirable form to connect to a connector of an aircraft tow vehicle. As depicted, tow point 320 is covered by actuated door 324. Actuated door 324 is closed during flight.

Figure 4:
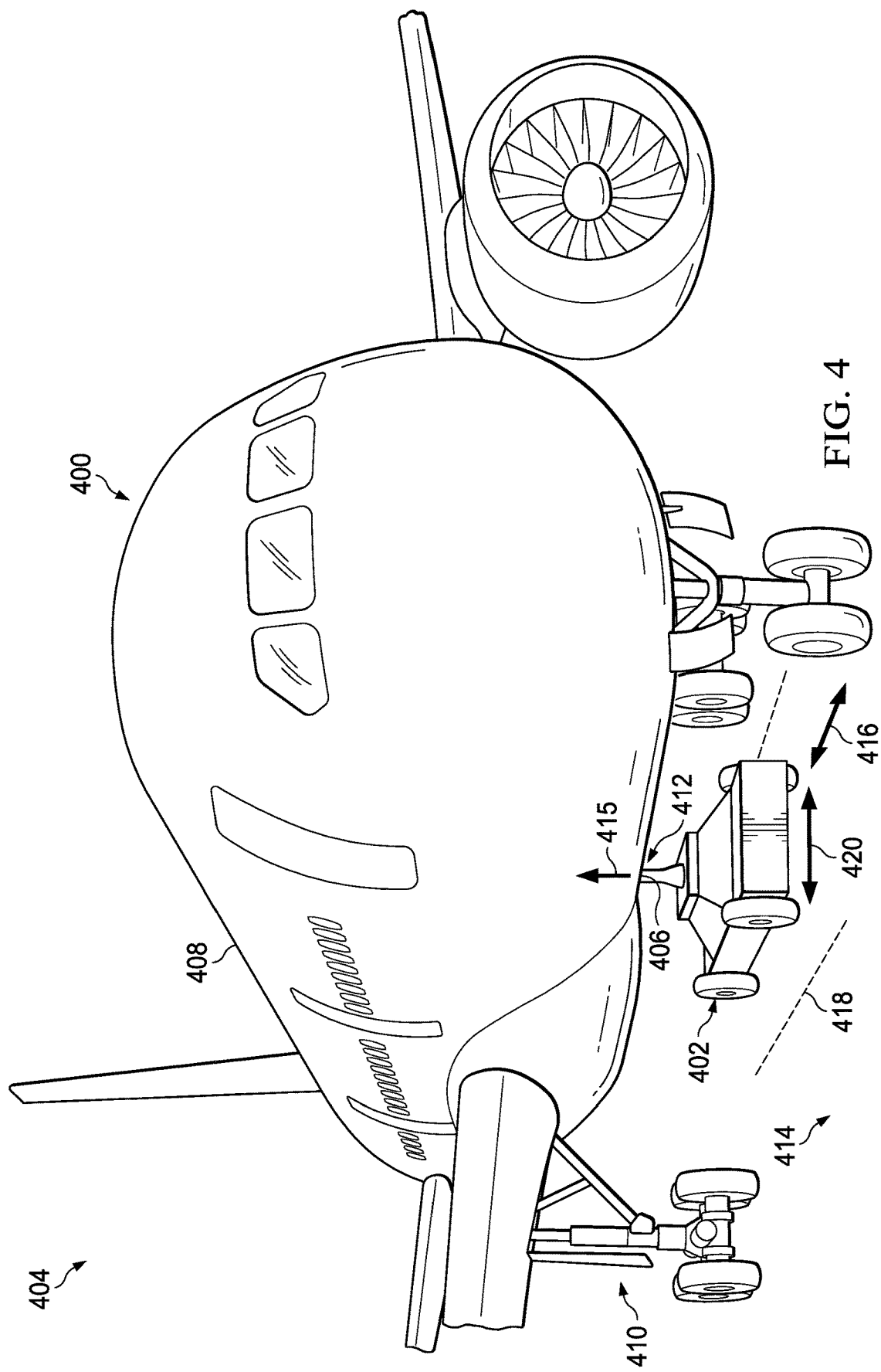
FIG. 4 is an illustration of a front view of an aircraft with a tow point connected to an aircraft tow vehicle in accordance with an illustrative embodiment.

Turning now to FIG. 4, an illustration of a front view of an aircraft with a tow point connected to an aircraft tow vehicle is depicted in accordance with an illustrative embodiment. Aircraft 400 is a physical implementation of aircraft 102 of FIG. 1. Aircraft tow vehicle 402 is a physical implementation of aircraft tow vehicle 124 of FIG. 1. In some illustrative examples, aircraft 400 is the same as aircraft 200 of FIG. 2. In some illustrative examples, aircraft 400 is the same as aircraft 300 of FIG. 3.

In view 404, aircraft tow vehicle 402 is connected to aircraft 400. Aircraft tow vehicle 402 is connected to aircraft 400 at tow point 406. Aircraft 400 has tow point 406 on body 408 of aircraft 400 and forward of main landing gear 410 of aircraft.

As depicted, aircraft tow vehicle 402 is positioned beneath aircraft 400. After positioning aircraft tow vehicle 402 beneath aircraft 400, a connector of aircraft tow vehicle is coupled to tow point 406 of aircraft 400 to form interface 412.

To have sufficient traction against ground 414 to propel aircraft 400, aircraft tow vehicle 402 applies upward force 415 to tow point 406 of aircraft 400. Applying upward force 415 introduces a normal force to aircraft 400 at tow point 406. Applying upward force 415 includes applying a force greater than 10,000 lbs.

After applying upward force 415, aircraft tow vehicle 402 is driven in direction 416. Driving aircraft tow vehicle 402 in direction 416 tows aircraft 400 in direction 416. Direction 416 runs forward and aft of aircraft 400.

As aircraft 400 is towed, lateral placement of aircraft tow vehicle 402 is maintained within a tolerance. Hashmarks 418 are indicative of an illustrative tolerance.

Lateral steering of aircraft 400 is performed using the aircraft controls of aircraft 400 as aircraft 400 is towed by aircraft tow vehicle 402. Lost motion in lateral direction 420 is supplied by at least one of interface 412 between aircraft 400 and aircraft tow vehicle 402 or a lost motion mechanism of aircraft tow vehicle 402. The lost motion in lateral direction 420 allows some movement of aircraft tow vehicle 402 in lateral direction 420 without affecting interface 412.

Aircraft tow vehicle 402 is maintained within the tolerance using any desirable method. In some illustrative examples, a visual sensor (not depicted) and control laws are used to keep aircraft tow vehicle 402 from exceeding the lost motion in lateral direction 420.

Figure 5:
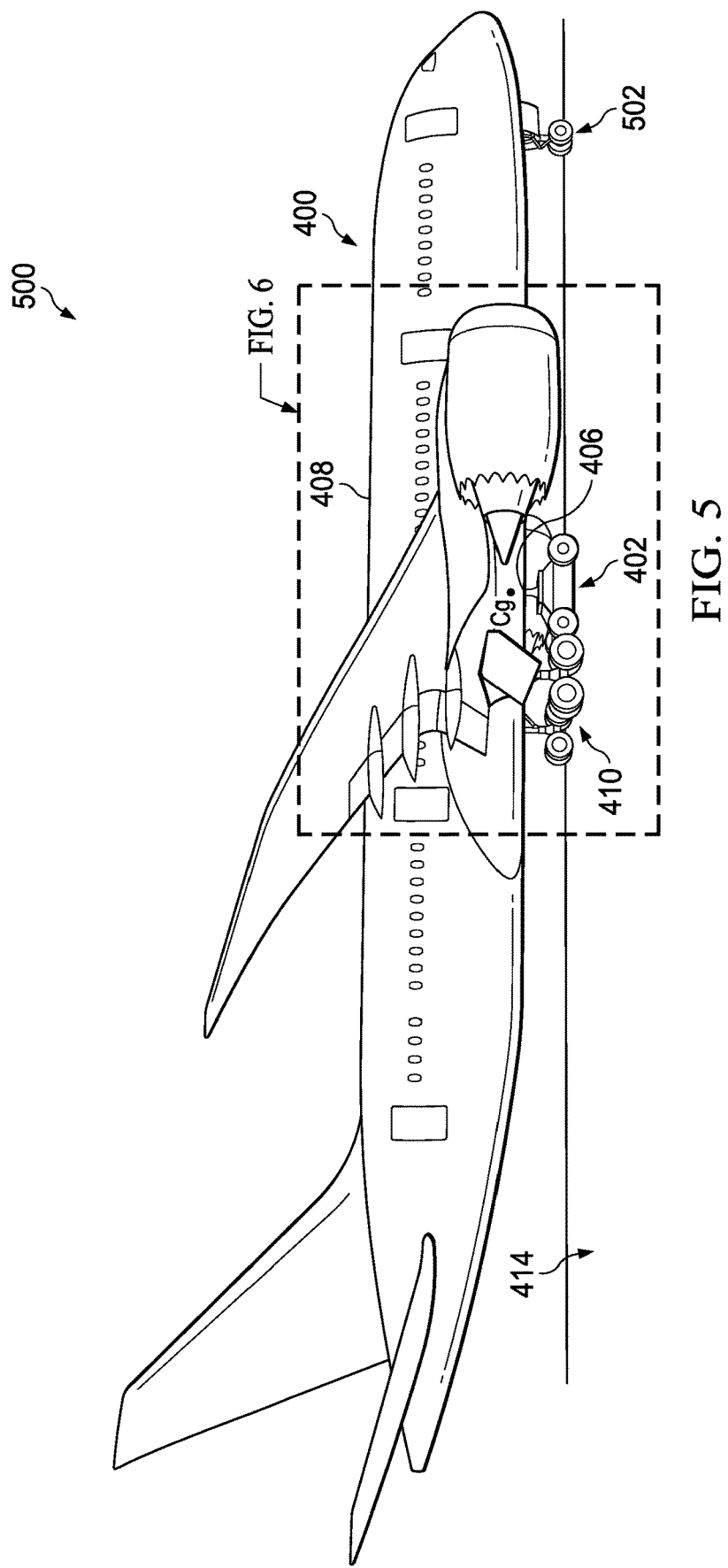
FIG. 5 is an illustration of a side view of an aircraft with a tow point connected to an aircraft tow vehicle in accordance with an illustrative embodiment.

Turning now to FIG. 5, an illustration of a side view of an aircraft with a tow point connected to an aircraft tow vehicle is depicted in accordance with an illustrative embodiment. View 500 is a side view of aircraft tow vehicle 402 towing aircraft 400.

In view 500, aircraft tow vehicle 402 is positioned beneath body 408 of aircraft 400. Aircraft tow vehicle 402 is positioned forward of main landing gear 410.

Tow point 406 is positioned at center of gravity, CG of aircraft 400. Tow point 406 is desirably not behind the center of gravity of aircraft 400. When tow point 406 is behind the center of gravity of aircraft 400, application of upward force 415 could apply an undesirable amount of force on nose landing gear 502.

Moving tow point 406 farther forward of center of gravity of aircraft 400 reduces steering effectiveness. Location of tow point 406 relative to the center of gravity of aircraft 400 is determined to achieve a desirable downward force for traction of aircraft tow vehicle 402 without compromising steering authority for aircraft 400.

Aircraft tow vehicle 402 is noticeably smaller than conventional tugs and tractors. Reduced size of aircraft tow vehicle 402 allows for aircraft tow vehicle 402 to be more nimble and faster than conventional tugs and tractors.

Figure 6:
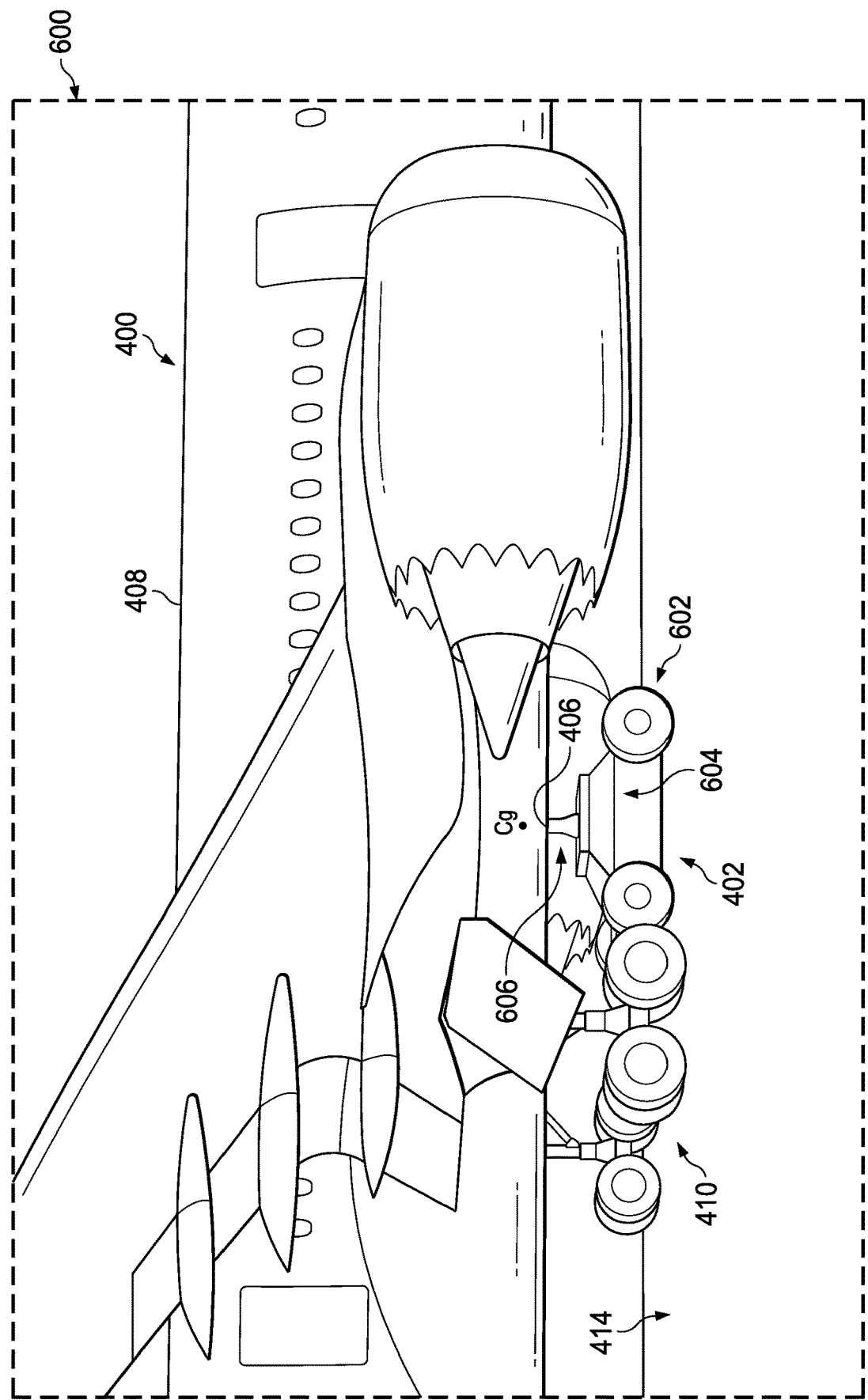
FIG. 6 is an illustration of a side view of an aircraft with a tow point connected to an aircraft tow vehicle in accordance with an illustrative embodiment.

Turning now to FIG. 6, an illustration of a side view of an aircraft with a tow point connected to an aircraft tow vehicle is depicted in accordance with an illustrative embodiment. View 600 is a view inside of the box marked as 600 of FIG. 5. In view 600, aircraft tow vehicle 402 can be more clearly seen. Aircraft tow vehicle 402 comprises movement system 602 configured to drive aircraft tow vehicle 402 across ground 414, active vertical loading system 604 configured to apply a load through connector 606 to tow point 406.

Figure 7:
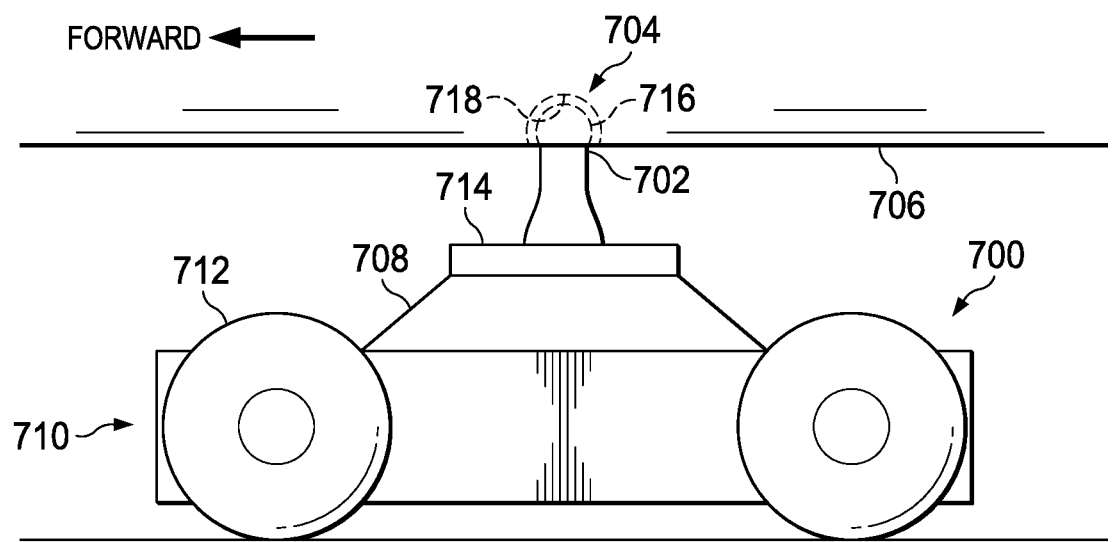
FIG. 7 is an illustration of a side view of an aircraft tow vehicle connected to a tow point of an aircraft in accordance with an illustrative embodiment.

Turning now to FIG. 7, an illustration of a side view of an aircraft tow vehicle connected to a tow point of an aircraft is depicted in accordance with an illustrative embodiment. Aircraft tow vehicle 700 is a physical implementation of aircraft tow vehicle 124 of FIG. 1. Aircraft tow vehicle 700 may be used to tow aircraft 200 of FIG. 2 or aircraft 300 of FIG. 3 after landing. In some illustrative examples, aircraft tow vehicle 402 of FIGS. 4-6 has the same design as aircraft tow vehicle 700.

Aircraft tow vehicle 700 comprises connector 702 configured to couple to tow point 704 of aircraft 706, active vertical loading system 708 configured to apply a load through connector 702 to tow point 704, and movement system 710 configured to drive aircraft tow vehicle 700 across the ground. The load provides traction to movement system 710. As depicted, movement system 710 comprises plurality of wheels 712.

Aircraft tow vehicle 700 also includes lost motion mechanism 714 between connector 702 and active vertical loading system 708. As depicted, connector 702 comprises ball hitch 716 configured to couple to receptacle 718. In this illustrative example, tow point 704 takes the form of receptacle 718. Aircraft tow vehicle 700 is configured to couple to tow point 704 and tow aircraft 706 while aircraft tow vehicle 700 is beneath aircraft 706.

The different components shown in FIGS. 2-7 may be combined with components in FIG. 1, used with components in FIG. 1, or a combination of the two. Additionally, some of the components in FIGS. 2-7 may be illustrative examples of how components shown in block form in FIG. 1 may be implemented as physical structures.

Figure 8:
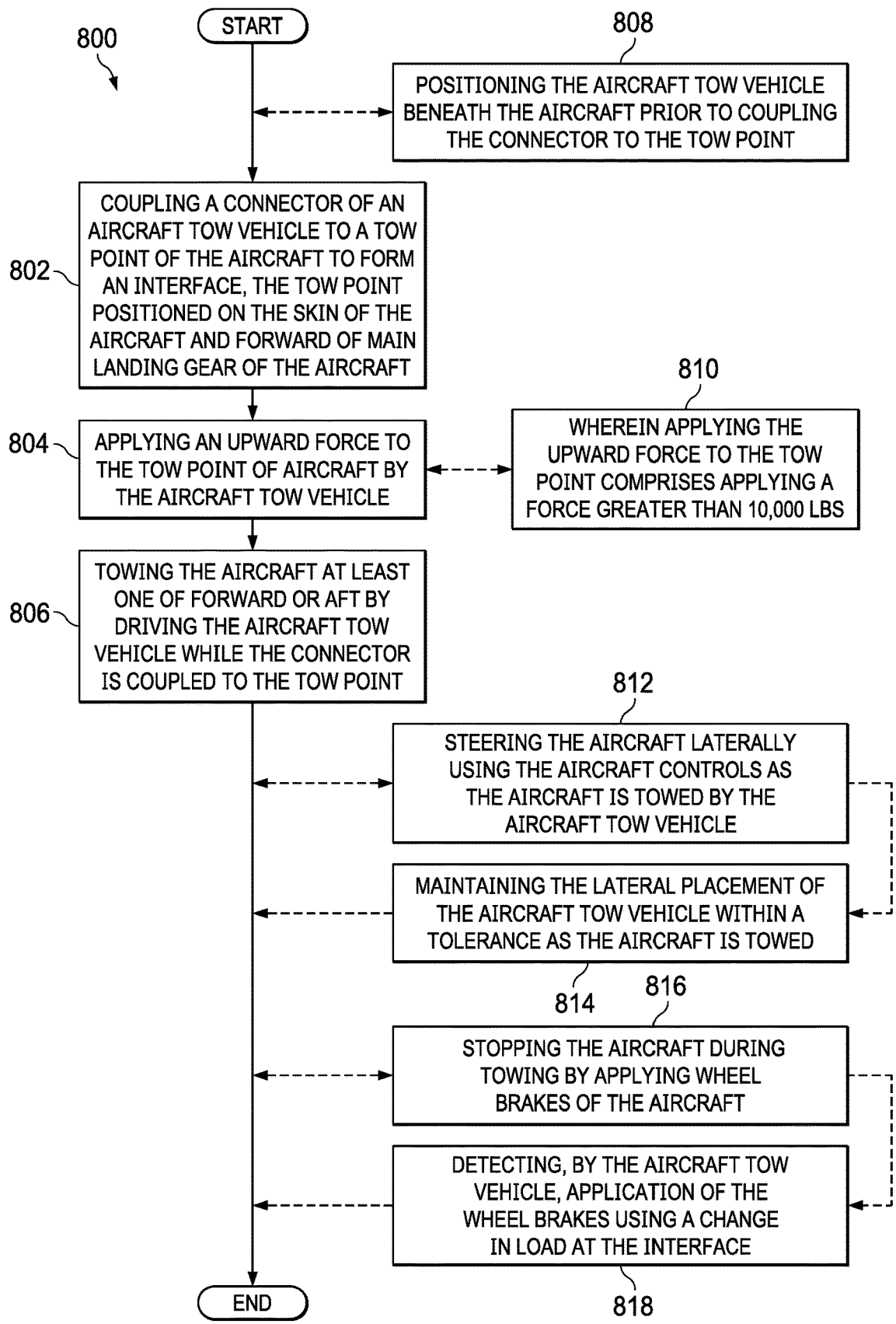
FIG. 8 is an illustration of a flowchart of a method of towing an aircraft in accordance with an illustrative embodiment.

Turning now to FIG. 8, an illustration of a flowchart of a method of towing an aircraft is depicted in accordance with an illustrative embodiment. Method 800 may be implemented using aircraft tow vehicle 124 and aircraft 102 of FIG. 1. Method 800 may be implemented using an aircraft tow vehicle and one of aircraft 200 of FIG. 2 or aircraft 300 of FIG. 3. Method 800 may be implemented by aircraft 400 and aircraft tow vehicle 402 of FIGS. 4-6. Method 800 may be implemented by aircraft tow vehicle 700 and aircraft 706 of FIG. 7.

Method 800 couples a connector of an aircraft tow vehicle to a tow point of the aircraft to form an interface, the tow point positioned on the skin of the aircraft and forward of main landing gear of the aircraft (operation 802). Method 800 applies an upward force to the tow point of aircraft by the aircraft tow vehicle (operation 804). Method 800 tows the aircraft at least one of forward or aft by driving the aircraft tow vehicle while the connector is coupled to the tow point (operation 806). Afterwards, method 800 terminates.

Prior to coupling the connector to the tow point, method 800 positions the aircraft tow vehicle beneath the aircraft (operation 808). In some illustrative examples, the aircraft tow vehicle is positioned beneath the center of gravity of the aircraft.

In some illustrative examples, applying the upward force to the tow point comprises applying a force greater than 10,000 lbs (operation 810). By applying a force greater than 10,000 lbs, traction of the aircraft tow vehicle is decrease. By applying the force greater than 10,000 lbs, the aircraft tow vehicle has a substantially reduced weight.

In some illustrative examples, method 800 steers the aircraft laterally using the aircraft controls as the aircraft is towed by the aircraft tow vehicle (operation 812). In other illustrative examples, the aircraft is steered laterally by the aircraft tow vehicle.

Method 800 maintains the lateral placement of the aircraft tow vehicle within a tolerance as the aircraft is towed (operation 814). By maintaining the lateral placement of the aircraft tow vehicle, the aircraft is laterally steered by the aircraft. By maintaining the lateral placement of the aircraft tow vehicle, lateral movement of aircraft tow vehicle is accommodated by a lost motion mechanism of the aircraft tow vehicle.

In some illustrative examples, method 800 stops the aircraft during towing by applying wheel brakes of the aircraft (operation 816). In some illustrative examples, method 800 detects, by the aircraft tow vehicle, application of the wheel brakes using a change in load at the interface (operation 818). In some illustrative examples, a communication device is present in aircraft tow vehicle to receive notice of braking.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 808 thorough operation 818 may be optional.

Figure 9:
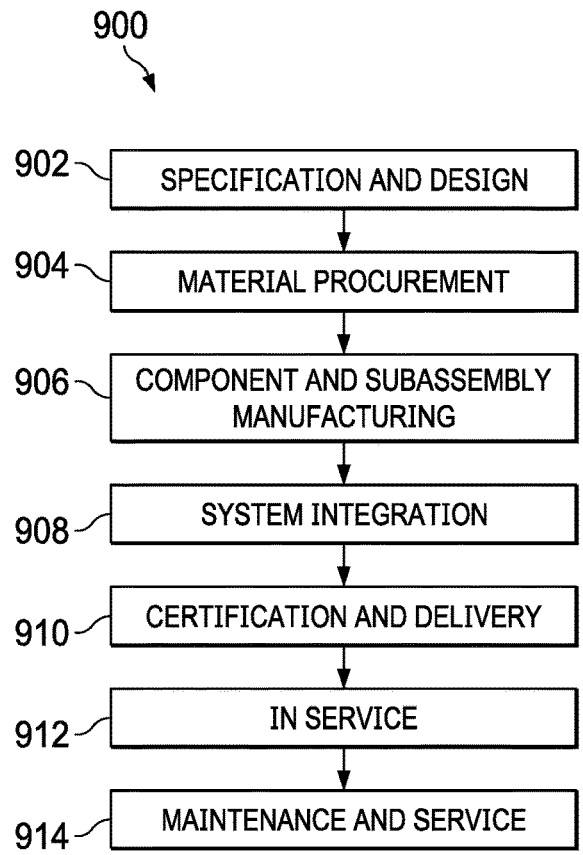
FIG. 9 is an illustration of an aircraft manufacturing and service method in a form of a block diagram in accordance with an illustrative embodiment.
Figure 10:
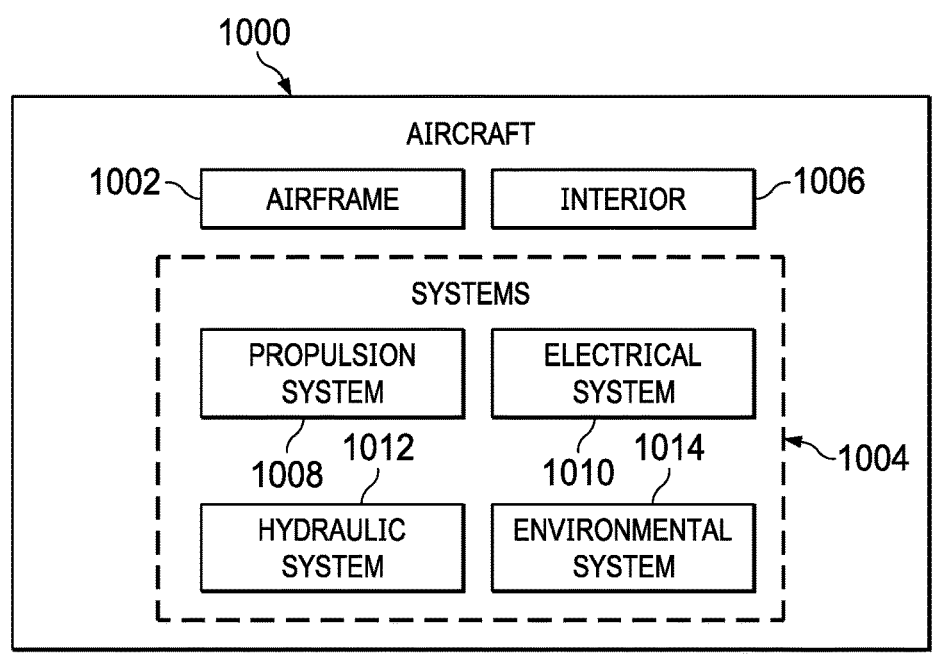
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9. Aircraft 1000 may take the form of aircraft 102 having tow point 104. For example, tow point 104 may be manufactured and installed during component and subassembly manufacturing 906. Aircraft tow vehicle 124 may be connected to tow point 104 of aircraft 102 during in service 912. As an example, method 800 may be used during in service 912 to tow aircraft 1000. As another illustrative example, aircraft tow vehicle 124 and tow point 104 may be used to tow aircraft 1000 during maintenance and service 914.

The illustrative examples present a tow point positioned on a body of an aircraft. The tow point enables use of a smaller aircraft tow vehicle than conventional tugs and tractors. The tow point is connected to an airframe of the aircraft to accept and distribute forces forward, aft, and normal to the aircraft. Forces normal to the aircraft provide sufficient traction to the aircraft tow vehicle. The application of force normal to the aircraft allows for the aircraft tow vehicle to be substantially lighter than conventional tugs and tractors. Forces forward and aft are applied to tow the aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft comprising:
a tow point positioned on a body of the aircraft and forward of main landing gear of the aircraft, wherein the tow point is connected to an airframe of the aircraft to accept and distribute forces forward, aft, and normal to the aircraft.

2. The aircraft of claim 1, wherein the tow point is positioned at approximately a center of gravity of the aircraft.

3. The aircraft of claim 1, wherein the tow point comprises a receptacle configured to receive a connector of an aircraft tow vehicle.

4. The aircraft of claim 1, wherein the tow point is connected to a keel beam of the airframe.

5. The aircraft of claim 1 further comprising:
an actuated door covering the tow point.

6. The aircraft of claim 1 further comprising:
reinforced skin surrounding the tow point, the reinforced skin configured to provide support for forces received through the tow point.

7. A method of towing an aircraft comprising:
coupling a connector of an aircraft tow vehicle to a tow point of the aircraft to form an interface, the tow point positioned on skin of the aircraft and forward of main landing gear of the aircraft;
applying an upward force to the tow point of the aircraft by the aircraft tow vehicle; and
towing the aircraft at least one of forward or aft by driving the aircraft tow vehicle while the connector is coupled to the tow point.

8. The method of claim 7 further comprising:
steering the aircraft laterally using aircraft controls of the aircraft as the aircraft is towed by the aircraft tow vehicle.

9. The method of claim 7 further comprising:
maintaining lateral placement of the aircraft tow vehicle within a tolerance as the aircraft is towed.

10. The method of claim 7, wherein applying the upward force to the tow point comprises applying a force greater than 10,000 lbs.

11. The method of claim 7 further comprising:
positioning the aircraft tow vehicle beneath the aircraft prior to coupling the connector to the tow point.

12. The method of claim 7 further comprising:
stopping the aircraft during towing by applying wheel brakes of the aircraft.

13. The method of claim 12 further comprising:
detecting, by the aircraft tow vehicle, application of the wheel brakes using a change in load at the interface.

14. An aircraft tow vehicle comprising:
a connector configured to couple to a tow point of an aircraft;
an active vertical loading system configured to apply a load through the connector to the tow point; and
a movement system configured to drive the aircraft tow vehicle across the ground, wherein the load provides traction to the movement system.

15. The aircraft tow vehicle of claim 14 further comprising:
   a lost motion mechanism between the connector and the active vertical loading system.

16. The aircraft tow vehicle of claim 14, wherein the movement system comprises a plurality of wheels.

17. The aircraft tow vehicle of claim 14, wherein the connector comprises a ball hitch configured to couple to a receptacle.

18. The aircraft tow vehicle of claim 14, wherein the aircraft tow vehicle is configured to couple to the tow point and tow the aircraft while the aircraft tow vehicle is beneath the aircraft.

19. The method of claim 7, wherein the tow point is connected to an airframe of the aircraft to accept and distribute forces forward, aft, and normal to the aircraft.

20. The method of claim 7, wherein the tow point is positioned at approximately a center of gravity of the aircraft.

* * * * *